(12) United States Patent
Schwarz Franceschini et al.

(10) Patent No.: US 10,633,804 B2
(45) Date of Patent: Apr. 28, 2020

(54) CHASSIS OF MOBILE ASPHALT PLANTS WITH SIDE PROTECTORS

(71) Applicant: CIBER EQUIPAMENTOS RODOVIARIOS LTDA, Porto Alegre (BR)

(72) Inventors: Andre Schwarz Franceschini, Porto Alegre (BR); Guilherme Luiz Piccoli, Porto Alegre (BR)

(73) Assignee: Ciber Equipamentos Rodoviarios LTDA, Porto Alegre (BR)

( * ) Notice: Subject to any disclaimer, the term of this patent is extended or adjusted under 35 U.S.C. 154(b) by 0 days.

(21) Appl. No.: 15/579,613

(22) PCT Filed: Jun. 3, 2016

(86) PCT No.: PCT/BR2016/050126
§ 371 (c)(1),
(2) Date: Dec. 5, 2017

(87) PCT Pub. No.: WO2016/197218
PCT Pub. Date: Dec. 15, 2016

(65) Prior Publication Data
US 2018/0135256 A1    May 17, 2018

(30) Foreign Application Priority Data

Jun. 9, 2015    (BR) .............................. 202015013385

(51) Int. Cl.
*F16P 1/02*        (2006.01)
*E01C 19/10*      (2006.01)

(52) U.S. Cl.
CPC .......... *E01C 19/1009* (2013.01); *E01C 19/10* (2013.01); *E01C 2019/1081* (2013.01); *F16P 1/02* (2013.01)

(58) Field of Classification Search
CPC ...... E01C 19/10; E01C 19/1009; E01C 19/45; E01C 2019/1081; F16P 1/02
See application file for complete search history.

(56) References Cited

U.S. PATENT DOCUMENTS

| 2,805,052 | A |   | 9/1957 | Preeman |
| 3,142,390 | A | * | 7/1964 | Preeman ............... B28C 9/0409 414/21 |
| 3,809,373 | A | * | 5/1974 | Brock .................... E01C 19/05 209/129 |

(Continued)

*Primary Examiner* — Tony G Soohoo
(74) *Attorney, Agent, or Firm* — Bay State IP, LLC

(57) ABSTRACT

The present utility model pertains to the technical field of equipment for producing asphalt concrete (AC) or hot mix asphalt concrete (HMAC), and relates more particularly to an improvement to mobile asphalt plants provided with side protectors. Proposed are protective screens for the areas which should be avoided by operators and others, where high temperatures and noise levels prevail. The protectors are installed in the area where virgin aggregate arriving from the metering system is transferred to the drying/heating system, where the intake temperature of the metered material is high and elements such as the conveyor belt can cause injury to operators. The other area to be isolated is the place where the burner of the plant carries out the process of combustion.

1 Claim, 2 Drawing Sheets

(56) References Cited

U.S. PATENT DOCUMENTS

| | | | | |
|---|---|---|---|---|
| 4,174,181 A | * | 11/1979 | Garbelman | E01C 19/1036 366/2 |
| 4,375,959 A | * | 3/1983 | Powell | E01C 19/05 110/224 |
| 4,477,250 A | * | 10/1984 | Brashears | E01C 19/1036 126/343.5 A |
| 5,620,249 A | * | 4/1997 | Musil | B28C 5/4282 34/136 |
| 6,186,654 B1 | * | 2/2001 | Gunteret, Jr. | B01F 5/265 366/18 |
| 6,656,242 B1 | * | 12/2003 | Golightly | B01D 50/00 366/22 |
| 7,458,746 B1 | * | 12/2008 | Zimmerman | E01C 19/1054 404/101 |
| 7,758,235 B1 | | 7/2010 | Collette | |
| 2012/0263007 A1 | * | 10/2012 | Swanson | E01C 19/05 366/7 |
| 2013/0058719 A1 | * | 3/2013 | Warlow | B01F 7/00433 404/92 |

* cited by examiner

CHASSIS OF MOBILE ASPHALT PLANTS WITH SIDE PROTECTORS

TECHNICAL FIELD OF THE UTILITY MODEL

Generally, the present utility model pertains to the technical field of equipment for producing Hot Mix Asphalt (HMA), and relates more particularly to an improvement to mobile asphalt plants through the use of side protectors (shields or fairings) that provide safety at work.

KNOWN STATE OF THE ART

Currently the use of mobile asphalt plants is a major technological breakthrough in the asphalt industry. The demand for such mainly derives from the need to move these mobilities in a short timeframe, streamlining the production process without overspending on cargo transport.

A number of alternatives related to mobile asphalt plant configurations can be observed as in the case of the Brazilian patent MU 8902008-1—"Asphalt Plant Provided with Independent Carts and Possibility of Angled Assembly", in which the assembly of the plant, containing all its production subsystems, can be installed both in a line or at an any angle and can be mounted on different sites. Said plant has two modules, wherein the dosage system is located in one module and cleaning system in the other. In turn, the utility model MU 8201924-0—"Constructive Arrangement in Hot Asphalt Plant", presents an arrangement considered to be small-scale which comprises all the components for manufacturing hot mix asphalt on a single chassis.

Further in the context of the present solution is Canadian patent CN102966023—"Movable Continuous Asphalt Mixture Mixing Plant', where the continuous asphalt plant simultaneously satisfies environmental protection policies and energy conservation. In turn, Korean patent KR100682605—"A Mobile Asphalt Mixing Plant", consists of an asphalt mixing plant with ease of assembly, placing the equipment rapidly into operating conditions.

The various systems that are part of the mobile asphalt plants allow the Hot Mix Asphalt (HMA) to be properly manufactured for later use. The production process begins with the virgin rock material, which is pre-selected, and subsequently the dosage of these aggregates is performed. At the end of this step, the wet material is transferred to a rotary dryer via a conveyor belt.

In the asphalt plants counter-flow with external mixture, object of the present specification, a burner is installed in the region opposite the entrance of the wet material having the objective of drying and heating it, respectively. The rotary drum dryer increases the heat transfer via internal flights. Special flights are inserted along the drum dryer so that the heat provided by the burner flame is efficiently transferred to the aggregate.

After the drying and heating step of the rock material, the material is sent to a Pug Mill-type twin-shaft mixer. From here onwards, the Asphalt Cement (AC) is injected. The AC will be mixed with the aggregate and the result of this intense mixing process will be the Hot Mix Asphalt. Once the process has finished, the asphalt mix is unloaded onto trucks or storage silos via a drag conveyor. The outlet temperature of this mix usually varies between 150-170° C.

The products from the combustion and drying present inside the dryer along with a small portion of the fine material are sent to the equipment's cleaning system by an exhaust fan. The air is purified by a primary inertial collector and by pleated-type filters. Evaluating the particle size of the material suctioned by the exhaust duct, the primary inertial collector will respond by the collection and reincorporation of the coarser fraction. This primary separation procedure enables the materials with the highest abrasion potential not to damage the filtering elements mounted downstream. Finally, the material not collected in the first stage, which corresponds to the smaller particle size is directed to the baghouse. Similarly, to the primary collector, the pleated-type filters prevent the rock material carried by the products from combustion and drying from being sent into the atmosphere and performs reincorporation to the external mixer.

During the manufacturing process of the Hot Mix Asphalt, high temperatures are noted in certain regions of the asphalt plant. Nevertheless, no alternative arrangement applied to mobile asphalt plants, as cited previously, has developed fairings to isolate these regions in order to increase work safety and prevent the risk of burns to the operator.

Currently, the concept project of mobile asphalt plants at domestic and international level has been constantly adapting to meet safety standards. These standards serve as a beacon in the implementation of collective protection measures designed to reduce the risk of accidents and offer conditions of comfort and safety at work. The design of accessible moving parts during normal operation, for example, should include protective items to prevent pinch points, clinging, trapping, and high temperature regions. Apart from the contact with heated surfaces, additional risks such as noise and ionizing radiation are also contemplated in regulatory safety standards and should be considered.

From the existing drawbacks in the arrangements of mobile asphalt plants used currently, described above in the state of the art, there is a visible gap in the existence of a protection implemented in the regions where the systems use high temperatures and noise during the production Hot Mix Asphalt (HMA). There is still no asphalt plant that contains protection shields/fairings for more hazardous regions in order to avoid injuries, currently neglected in many items of equipment.

NOVELTIES AND OBJECTIVES OF THE UTILITY MODEL

With a view to filling the gaps seen in the state of the art, the present utility model provides an innovative solution relating to a mobile asphalt plant endowed with heat-insulating protectors (shields) for regions where the equipment operates at high temperatures.

Considering that in large mobile asphalt plants, due to matters of sizing, it is customary to transfer the dosage region to an independent mobility, the systems responsible for drying, heating, filtering, exhaustion, mixing and discharging are installed in a second mobility. The transfer of the virgin aggregate of the dosage system to the drying/heating system will require a conveyor belt, which is installed and aligned in the vicinity of the dryer. Since this region constitutes the gateway of the virgin aggregate to the dryer, the temperature at this location should be high and access thereto should be prevented by implementing shields installed at the intersection between the two mobilities. Moreover, elements such as the conveyor belt, due to their movement for transporting the virgin aggregate, may cause injuries to operators if access is not barred. Thus the side protectors will prevent the workers operating the equipment from having access to the virgin aggregate conveyor.

In continuous asphalt plants, counter-flow and with external mixing, both the burner and the Pug-mill external mixer, are mandatorily allocated in a common region. The combustion process run by the burner is performed by an optimal ratio between fuel and air. Even though the flame resulting from the combustion enclosed within the rotary dryer and the combustion chamber uses thermally-insulating materials, high temperatures may be noted due to the thermal radiation in the region where both burner and mixer are installed. When heavy fuels are used, it is necessary to reduce the viscosity thereof as of heating. In this case, it is necessary to use jacketed pipes heated by thermal oil or through electrical resistances. Jacketed pipes with thermal oil or electrical resistances must necessarily also be used in the pipes that convey the Asphalt Cement (AC) to the sprinkler bar of the mixer.

Thus, the present solution also seeks to protect the region comprising the burner and the mixer in order to avoid any contact of the operators with the system and provide noise attenuation in this region, which has items with higher noise emission. Therefore, by using the shields that thermally and acoustically isolate these regions, it is possible to increase comfort and safety at work.

DESCRIPTION OF THE ACCOMPANYING DRAWINGS

So that the present utility model is fully understood and put into practice by any skilled person from this technical field, it will be in a clear, concise and sufficient manner, based on the accompanying drawings listed below that illustrate and support:

DETAILED DESCRIPTION OF THE UTILITY MODEL

Since in large mobile asphalt plants the dosing region is transferred to an independent mobility, the systems of drying, heating, filtering, exhaustion, mixing and unloading are installed on a second mobility and the transfer of the virgin aggregate from the dosage system to the drying/heating system will require a conveyor belt (6), which is installed and aligned in the vicinity of the dryer (5).

Figure 1:
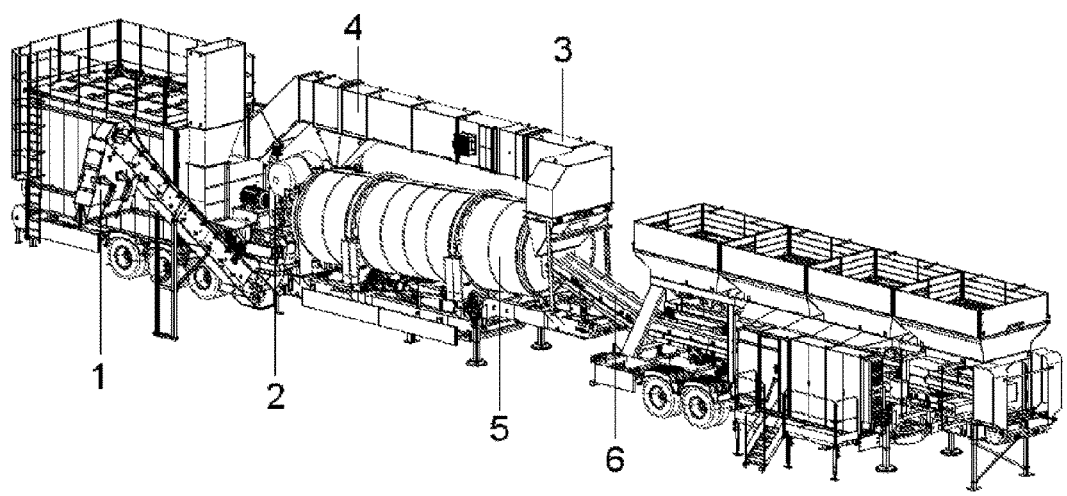
FIG. 1 is a perspective view of the mobile asphalt plant with the region of the burner and mixer and the region of the aggregate conveyor belt without side protectors.

According to FIG. 1, it is possible to note the arrangement of an asphalt plant currently used for the production of Hot Mix Asphalt, wherein the step of dosing aggregates is followed by the step of sending the wet virgin material to a rotary dryer (5) via the conveyor belt (6). A burner is installed in the region (2) opposite the entrance of the wet virgin material in order to dry and heat it, respectively. Special Flights are employed along the drum dryer (5) so that the heat provided by the burner flame is efficiently transferred to the virgin aggregate.

After the drying and heating step, the material is sent to a Pug Mill-type twin-shaft mixer also located in the region (2) opposite the entrance of the wet virgin material. The process of manufacturing Hot Mix Asphalt (HMA) is thus finalized, being unloaded onto trucks or into storage silos via a drag conveyor (1).

Figure 2:
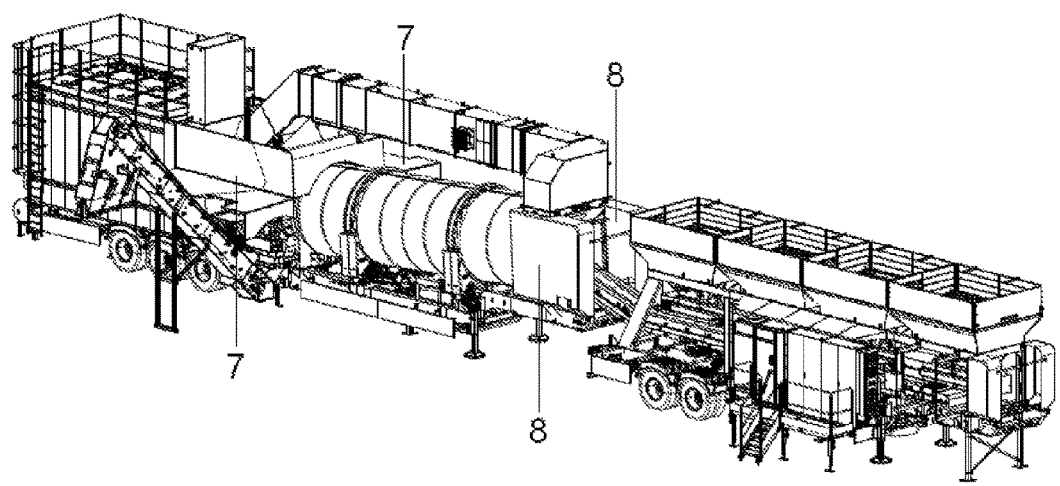
FIG. 2 is the mobile asphalt plant with the side protectors in the transport region and the articulated side protector relating to the region of the mixer and burner.
Figure 3:
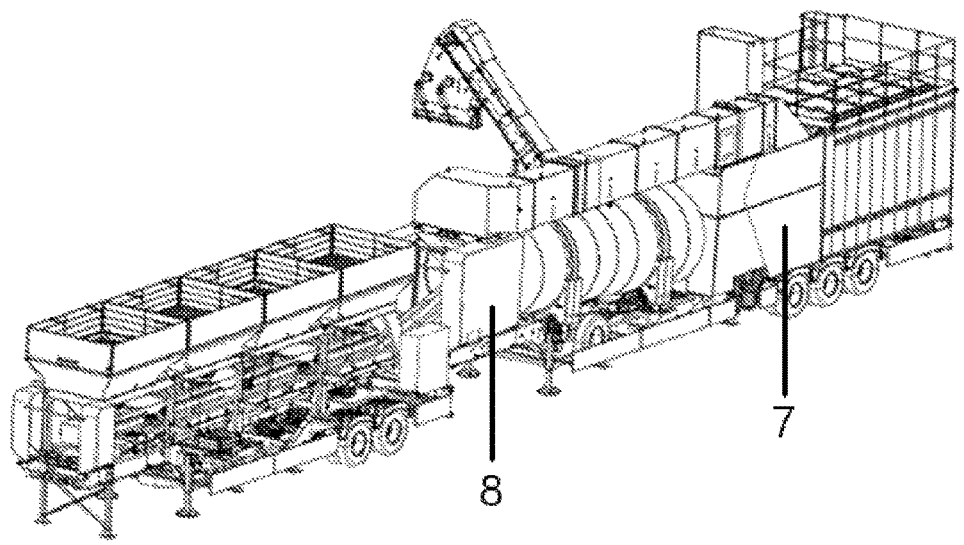
FIG. 3 is the mobile asphalt plant with the side protector of the region of the mixer and burner closed.
Figure 4:
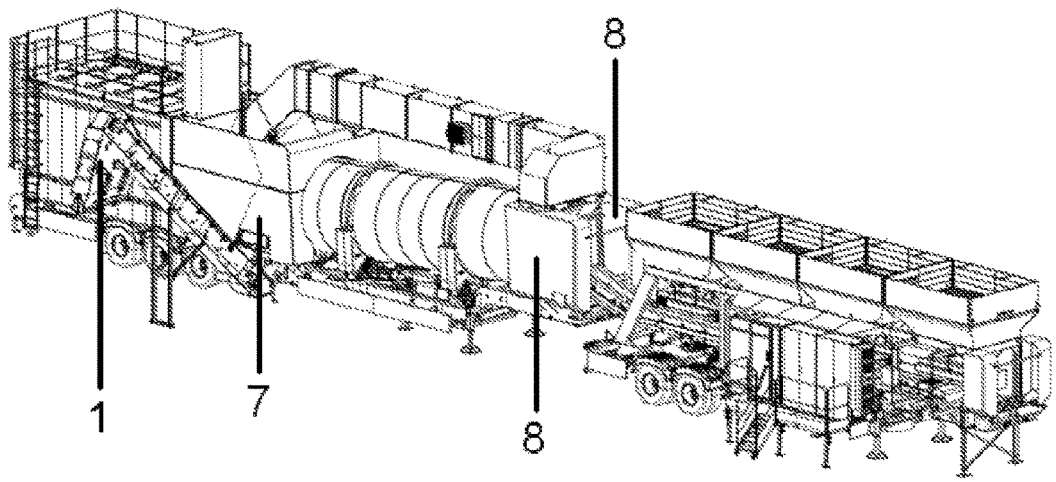
FIG. 4 is the mobile asphalt plant with the side protector closed in the region of the drag conveyor.

As shown in FIG. 2, since the region of the conveyor belt (6) in the vicinity of the dryer (5) constitutes the gateway for the virgin aggregate to the dryer (5), the temperature must be high. At this location, the gases inside the dryer may reach a temperature between 100-160° C. Additionally, the linear and circular movement inherent to the conveyor belt may cause accidents at work. Accordingly, a side protector (8) has been installed so that access to this region is barred. The side protectors (8) are symmetrical and fixed on the chassis structure in the region connecting the two mobilities. The shields that protect the belt region do not need thermal and acoustic insulation. The heat transfer by radiation in this region is not as high as in region (2). In this region, it is most important to bar operator access to the conveyor belt.

In region (2) where the burner and the external Pug-mill mixer are allocated, the combustion process performed by the burner is by way of an optimal ratio between fuel and air and high temperatures are noted due to the thermal radiation in the region. When heavy fuels are used, it is necessary to use jacketed pipes heated by thermal oil or through electrical resistances.

So thermally and acoustically insulating shields (7) were installed in the region (2) which comprises the burner and the mixer in order to prevent any contact of the operators with heated systems. These fairings are attached to the combustion chamber and to the baghouse by way of fastening elements. Since the protected region will likely require constant preventive and corrective maintenance, access to this sector cannot remain fully barred. Accordingly, an articulated system for these shields should facilitate necessary interventions, as shown in FIG. 2.

It is important to highlight that the figures and description does not have the weight of limiting the embodiments of the inventive concept now proposed, but rather to illustrate and make understandable the conceptual innovations disclosed in this utility model. Therefore, the descriptions and pictures should be interpreted illustratively and not limitatively, as there may be other equivalent or similar forms of implementing the inventive concept now disclosed and that do not stray from the scope of protection delineated in the solution proposed.

The present specification discloses a solution that consists of an improvement to mobile asphalt plants endowed with side protectors, endowed with novelty, inventive step, descriptive sufficiency [full disclosure], industrial application and consequently satisfies all the essential requirements for the grant of the privilege claimed.

The invention claimed is:
1. A mobile asphalt plant endowed with side protectors comprising:
   a gas exhaust duct;
   a rotary dryer (5);
   an exhaust fan;
   an inertial separator;
   a baghouse;
   a mixer;
   a chimney;
   a conveyor belt (6);
   a drag conveyor (1);
   thermally and acoustically insulating shields (7) located on both sides of the asphalt plant in a region (2) of the mixer and burner;

wherein the shield is attached to the baghouse and a combustion chamber by fastening elements and further comprising:
  an articulated system, wherein the articulated system facilitates necessary interventions to the region (2) of the mixer and burner; and
  side protectors (8) in a region of the conveyor belt (6), wherein the side protectors are symmetrical and fixed on the chassis structure by the conveyor belt to prevent access by an operator.

* * * * *